(12) United States Patent
Nies et al.

(10) Patent No.: US 10,840,027 B2
(45) Date of Patent: *Nov. 17, 2020

(54) HIGH VOLTAGE TUNABLE MULTILAYER CAPACITOR

(71) Applicant: AVX Corporation, Fountain Inn, SC (US)

(72) Inventors: Craig W. Nies, Greenville, SC (US); Andrew P. Ritter, Simpsonville, SC (US); Richard C. VanAlstine, Piedmont, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,616

(22) Filed: Sep. 7, 2018

(65) Prior Publication Data
US 2019/0080851 A1  Mar. 14, 2019

Related U.S. Application Data

(60) Provisional application No. 62/555,924, filed on Sep. 8, 2017.

(51) Int. Cl.
*H01G 7/06* (2006.01)
*H01G 4/012* (2006.01)
(Continued)

(52) U.S. Cl.
CPC ............... *H01G 7/06* (2013.01); *H01G 4/012* (2013.01); *H01G 4/232* (2013.01); *H01G 4/30* (2013.01); *H01G 4/12* (2013.01)

(58) Field of Classification Search
CPC ............ H01G 4/012; H01G 4/12; H01G 4/30; H01G 4/248; H01G 4/1227; H01G 4/008; H01G 4/228; H01G 7/06
See application file for complete search history.

(56) References Cited

U.S. PATENT DOCUMENTS 3,809,971 A   5/1974  Hluchan et al.
5,472,935 A  12/1995  Yandrofski et al.
(Continued)

OTHER PUBLICATIONS

Abstract of Japanese Patent—JPH0878285, Mar. 22, 1996, 2 pages.
(Continued)

*Primary Examiner* — Michael P McFadden
(74) *Attorney, Agent, or Firm* — Dority & Manning, P.A.

(57) ABSTRACT

A tunable multilayer capacitor is provided. The capacitor comprises a first active electrode in electrical contact with a first active termination and a second active electrode in electrical contact with a second active termination. The capacitor comprises a first DC bias electrode in electrical contact with a first DC bias termination and a second DC bias electrode in electrical contact with a second DC bias termination. A plurality of dielectric layers disposed between the first and second active electrodes and between the first and second bias electrodes. At least a portion of the dielectric layers contain a tunable dielectric material that exhibits a variable dielectric constant upon the application of an applied DC voltage across the first and second DC bias electrodes. A thickness of at least one of the plurality of dielectric layers is greater than about 15 micrometers.

23 Claims, 18 Drawing Sheets

(51) Int. Cl.
*H01G 4/232* (2006.01)
*H01G 4/30* (2006.01)
*H01G 4/12* (2006.01)

(56) References Cited

U.S. PATENT DOCUMENTS

| | | | |
|---|---|---|---|
| 5,589,845 | A | 12/1996 | Yandrofski et al. |
| 5,986,864 | A | 11/1999 | Davis |
| 6,187,061 | B1 | 2/2001 | Amatucci et al. |
| 6,377,142 | B1 | 4/2002 | Chiu et al. |
| 6,493,207 | B2 | 12/2002 | Nakano et al. |
| 6,514,895 | B1 | 2/2003 | Chiu et al. |
| 6,683,782 | B2 | 1/2004 | Duva |
| 6,727,535 | B1 | 4/2004 | Sengupta et al. |
| 6,737,179 | B2 | 5/2004 | Sengupta |
| 6,774,077 | B2 | 8/2004 | Sengupta et al. |
| 6,905,989 | B2 | 6/2005 | Ellis et al. |
| 7,145,415 | B2 | 12/2006 | Sengupta et al. |
| 7,393,604 | B2 | 7/2008 | Rocke et al. |
| 7,557,055 | B2 | 7/2009 | Zhang et al. |
| 7,869,187 | B2 | 1/2011 | McKinzie, III |
| 7,893,561 | B2 | 2/2011 | Weidenheimer et al. |
| 8,009,407 | B2 | 8/2011 | Leidl et al. |
| 8,112,852 | B2 | 2/2012 | Mendolia et al. |
| 8,243,417 | B2 | 8/2012 | Kanno et al. |
| 8,354,166 | B2 | 1/2013 | Tan et al. |
| 8,699,204 | B2 | 4/2014 | Demcko et al. |
| 9,001,486 | B2 | 4/2015 | Anthony et al. |
| 9,019,679 | B2 | 4/2015 | Anthony et al. |
| 9,041,491 | B2 | 5/2015 | Sato et al. |
| 9,047,524 | B2 | 6/2015 | Ikemoto et al. |
| 9,318,266 | B2 | 4/2016 | Capanu et al. |
| 9,390,857 | B2 | 7/2016 | Tan et al. |
| 9,397,632 | B2 | 7/2016 | Tan et al. |
| 9,728,340 | B2 | 8/2017 | Ishii et al. |
| 9,819,064 | B2 | 11/2017 | Jiang et al. |
| 2004/0175585 | A1 | 9/2004 | Zou et al. |
| 2004/0178867 | A1 | 9/2004 | Rahman et al. |
| 2005/0286207 | A1* | 12/2005 | Ito ............... B32B 18/00 361/321.2 |
| 2006/0245141 | A1* | 11/2006 | Shirasu ............ H01G 4/012 361/303 |
| 2007/0030100 | A1 | 2/2007 | Rahman et al. |
| 2008/0049375 | A1* | 2/2008 | Lee ............... H01G 7/06 361/301.3 |
| 2008/0068801 | A1 | 3/2008 | Wilk |
| 2008/0199737 | A1 | 8/2008 | Kazaryan et al. |
| 2008/0232023 | A1* | 9/2008 | Oakes ............. H01G 7/06 361/280 |
| 2010/0188799 | A1* | 7/2010 | Galvagni .......... H01G 4/012 361/306.3 |
| 2013/0229749 | A1* | 9/2013 | Lee ............... H01G 4/12 361/321.2 |
| 2013/0286534 | A1 | 10/2013 | Ikehachi et al. |
| 2013/0335882 | A1* | 12/2013 | Ma .............. H01G 4/008 361/305 |
| 2014/0247534 | A1 | 9/2014 | Sato et al. |
| 2015/0103466 | A1* | 4/2015 | Engel ............. H01G 4/30 361/301.4 |
| 2015/0325371 | A1* | 11/2015 | Hattori ........... H01G 4/232 361/301.4 |
| 2016/0268052 | A1 | 9/2016 | Gando et al. |
| 2017/0162335 | A1* | 6/2017 | Ritter ............. H01G 7/06 |
| 2018/0190436 | A1* | 7/2018 | Duwel ............ H01G 7/00 |
| 2019/0103228 | A1* | 4/2019 | Nies .............. H01G 7/06 |

OTHER PUBLICATIONS

Abstract of Japanese Patent—JP2008066682, Mar. 21, 2008, 2 pages.
Abstract of WO2015001222 (A1), Jan. 8, 2015, 2 pages.
Product Information—TurboCap™ High-CV SMPS Capacitors from AVX Corporation, May 2015, 3 pages (49-51).
Related U.S. Application Form.
Related Application Form.
Dielectric Properties and Ferroelectric Phase Transition of Non-linear Tunable Barium Calcium Titanate Ceramic, by Gu Nuihua Chinese Doctoral Dissertations/Masters'Theses Full-text Database (Master) Engineering Science and Technology I, Edition 09, 2006.
Dielectric Properties and Ferroelectric Phase Transition of Non-linear Tunable Barrium Calcium Tin Titanate Ceramix, by Gu Huihua, Chinese Doctoral Dissertations/Masters' Theses Full-text Database (Master) Engineering Science and Technology 1, Edition 09, 2005.

* cited by examiner

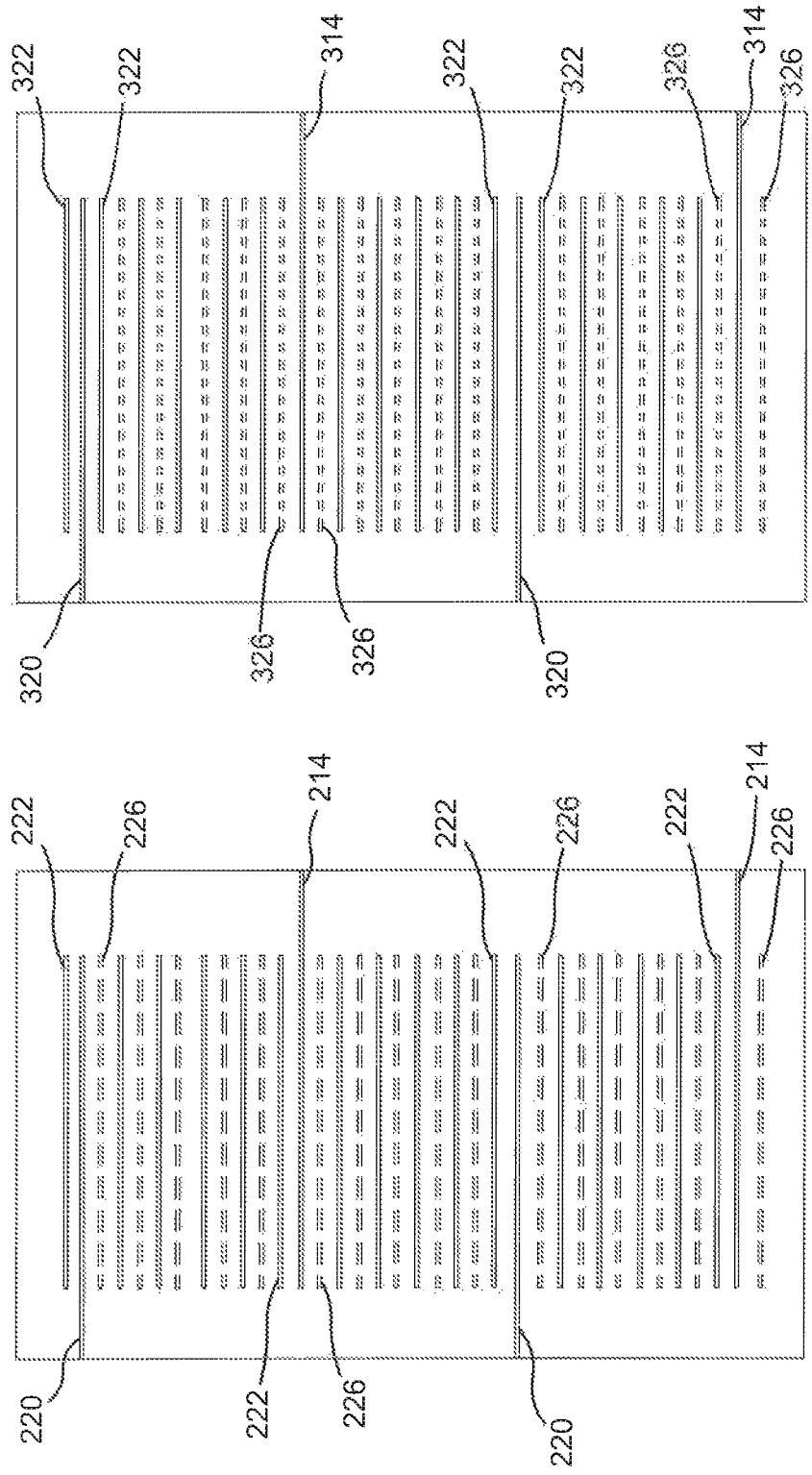

US 10,840,027 B2

1

HIGH VOLTAGE TUNABLE MULTILAYER CAPACITOR

CROSS REFERENCE TO RELATED APPLICATION

The present application claims filing benefit of U.S. Provisional Patent Application Ser. No. 62/555,924 having a filing date of Sep. 8, 2017, which is incorporated herein by reference in its entirety.

BACKGROUND OF THE INVENTION

Tunable capacitors have been proposed in various applications that rely on the variable dielectric properties of the dielectric. For such capacitors, the capacitance at zero bias is typically near its maximum and the capacitance drops with applied voltage. The change in capacitance allows these units to be used to create tunable circuits in filters, matching networks, resonant circuits and other applications from audio to RF and microwave frequencies. Despite their benefits, the use of such capacitors has been relatively limited due in part to the relatively low capacitance values achieved at high power and voltage levels. As such, a need currently exists for a voltage tunable capacitor having improved properties that can be employed in a wider range of possible applications.

SUMMARY OF THE INVENTION

In accordance with one embodiment of the present disclosure, a tunable multilayer capacitor is disclosed that comprises a first active electrode in electrical contact with a first active termination and a second active electrode in electrical contact with a second active termination. The capacitor also comprises a first DC bias electrode in electrical contact with a first DC bias termination and a second DC bias electrode in electrical contact with a second DC bias termination. The capacitor also comprises a plurality of dielectric layers disposed between the first and second active electrodes and between the first and second bias electrodes. At least a portion of the dielectric layers contain a tunable dielectric material that exhibits a variable dielectric constant upon the application of an applied DC voltage across the first and second DC bias electrodes. A thickness of at least one of the plurality of dielectric layers is greater than about 15 micrometers.

In accordance with another embodiment of the present disclosure, a tunable multilayer capacitor is disclosed that comprises a first active electrode in electrical contact with a first active termination and a second active electrode in electrical contact with a second active termination. The capacitor also comprises a first DC bias electrode in electrical contact with a first DC bias termination and a second DC bias electrode in electrical contact with a second DC bias termination. The capacitor also comprises a plurality of dielectric layers disposed between the first and second active electrodes and between the first and second bias electrodes. At least a portion of the dielectric layers contain a tunable dielectric material that exhibits a variable dielectric constant upon the application of an applied DC voltage across the first and second DC bias electrodes. The applied DC voltage is greater than about 100 V without exceeding about 50% of a breakdown voltage of the tunable dielectric material.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which:

FIG. 8 illustrates a sectional view of an exemplary embodiment of an 11:1 ratio non-shielded asymmetric design of a biased multilayer capacitor in accordance with presently disclosed subject matter;

FIG. 9 illustrates a sectional view of an exemplary embodiment of an 11:1 ratio shielded asymmetric design of a biased multilayer capacitor in accordance with presently disclosed subject matter;

Figure 1:
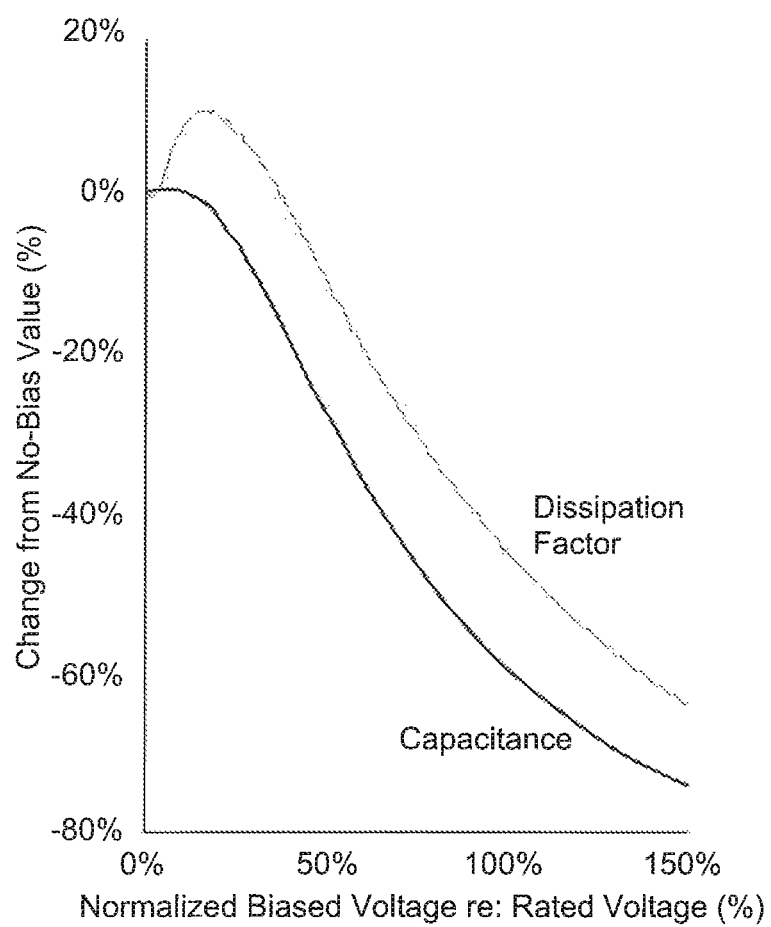
FIG. 1 graphically illustrates the change in capacitance achievable with use of the presently disclosed subject matter, over a range of normalized biasing voltage changes.

Repeat use of reference characters throughout the present specification and appended drawings is intended to represent same or analogous features, elements, or steps thereof.

DETAILED DESCRIPTION OF THE INVENTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a multilayer capacitor that contains a plurality of dielectric layers interposed between alternating active electrode layers. At least a portion of the dielectric layers include a tunable material that exhibits a variable dielectric constant upon the application of an applied voltage. More particularly, such materials typically have a "voltage tunability coefficient" within the range of from about 10% to about 90%, in some embodiments from about 20% to about 80%, and in some embodiments, from about 30% to about 70%, wherein the "voltage tunability coefficient" is determined according to the following general equation:

$$T = 100 \times (\varepsilon_0 - \varepsilon_V)/\varepsilon_0$$

wherein,

T is the voltage tunability coefficient;

$\varepsilon_0$ is the static dielectric constant of the material without an applied voltage; and $\varepsilon_V$ is the variable dielectric constant of the material after application of the applied voltage (DC).

The static dielectric constant of the material typically ranges from about 100 to about 25,000, in some embodiments from about 200 about 10,000, and in some embodiments, from about 500 to about 9,000, such as determined in accordance with ASTM D2149-13 at operating temperatures ranging from about −55° C. to about 150° C. (e.g., 25° C.) and frequencies ranging from about 100 Hz to about 1 GHz (e.g., 1 kHz). Of course, it should be understood that the specific value of the static dielectric constant is generally selected based on the particular application for which the capacitor is employed. When applied with an increased DC bias, the dielectric constant generally decreases within the ranges noted above. The tuning voltage applied to induce the desired change in dielectric constant may generally vary relative to the voltage at which the dielectric composition begins to become conductive upon application of an electric field ("breakdown voltage"), which can be determined in accordance with ASTM D149-13 at a temperature of 25° C. In most embodiments, the applied DC bias voltage is about 50% or less, in some embodiments, about 30% or less, and in some embodiments, from about 0.5% to about 10% of the breakdown voltage of the dielectric composition.

Figure 10:
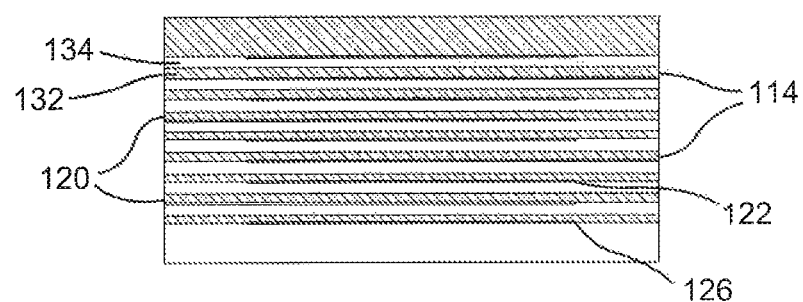
FIG. 10 illustrates a sectional view of an exemplary embodiment of a compositionally blended biased multilayer capacitor in accordance with presently disclosed subject matter.

Any of a variety of tunable dielectric materials may generally be employed as is known in the art. Particularly suitable materials are dielectrics whose base composition includes one or more ferroelectric base phases, such as perovskites, tungsten bronze materials (e.g., barium sodium niobate), layered structure materials (e.g., bismuth titanate). Suitable perovskites may include, for instance, barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other electronically tunable dielectric materials may be used partially or entirely in place of barium strontium titanate. For instance, one example is $Ba_xCa_{1-x}TiO_3$, wherein x is from about 0.2 to about 0.8, and in some embodiments, from about 0.4 to about 0.6. Other suitable pervoskites may include $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). A potential dielectric material of interest may be formed by combining two end-member compositions in alternating layers, as shown in the exemplary embodiment of FIG. 10. Such end-member compositions may be chemically similar, but differ in the ratios of A-site dopants as discussed above. For example, composition 1 (132 in FIG. 10) may be a perovskite compound of the general formula $(A1_x, A2_{(1-x)})BO_3$ and composition 2 (134) may be a perovskite of the general formula $(A1_y, A2_{(1-y)})BO_3$, where A1 and A2 are from Ba, Sr, Mg, and Ca; the potential B-site members are Zr, Ti and Sn, and "x" and "y" denote the mole fraction of each component. A specific example for compound 1 may be $(Ba_{0.8}Sr_{0.2})TiO_3$ and compound 2 may be $(Ba_{0.6} Sr_{0.4})TiO_3$. These two compounds may be combined in alternating layers in a sintered multilayer capacitor with tunable electrode structures, as shown in FIG. 10, such that the dielectric properties of each material are superimposed. If desired, the pervoskite material may also be doped with rare earth oxides ("REO"), such as in an amount less than or equal to 5.0 mole percent, and more preferably from 0.1 to 1 mole percent. Suitable rare earth oxide dopants for this purpose may include, for instance, scandium, yttrium, lanthanum, cerium, praseodymium, neodymium, promethium, samarium, europium, gadolinium, terbium, dysprosium, holmium, erbium, thulium, ytterbium, and lutetium.

Regardless of the particular material employed, the use of a tunable dielectric material can allow for the capacitance of the resulting capacitor to be tuned by applying a DC bias voltage through bias terminations. More particularly, the capacitor contains a set of first active electrodes that are in electrical contact with a first active termination (e.g., input termination) and a set of second active electrodes that are in electrical contact with a second active termination (e.g., output termination). The capacitor also contains a set of first DC bias electrodes that are in electrical contact with a first DC bias termination and a set of second DC bias electrodes that are in electrical contact with a second DC bias termination. When provided in a circuit, a DC power source (e.g., battery, constant voltage power supply, multiple output power supply, DC-DC converters, etc.) can provide a DC bias to the capacitor through the first and second bias terminations, which are typically bipolar in that they have an opposite polarity. The electrodes and terminations may be formed from any of a variety of different metals as is known in the art, such as precious metals (e.g., silver, gold, palladium, platinum, etc.), base metals (e.g., copper, tin, nickel, etc.), and so forth, as well as various combinations thereof. The dielectric layers are interposed between the respective active electrode and bias electrodes.

Regardless of the particular configuration employed, the present inventors have discovered that through selective control over the nature of the tunable dielectric material, the number of dielectric layers, and the thicknesses of the dielectric layers, a capacitor can be achieved that exhibits excellent tunability over a wide range of voltage and capacitance values. For instance, such a capacitor may allow for higher applied DC bias voltage values and higher capacitance in a single capacitor (as compared with multiple capacitors connected in parallel) having smaller overall size than conventionally thought possible. In certain embodiments, for instance, the applied DC bias voltage may be greater than about 10 V, in some embodiments greater than about 50 V, in some embodiments greater than about 100 V, in some embodiments greater than about 350 V, in some embodiments greater than about 500 V, in some embodiments greater than about 750 V, in some embodiments greater than about 1000 V, in some embodiments greater than about 1200 V, and in some embodiments greater than about 1500 V. For example, in some embodiments, the applied DC bias voltage may range from about 10 V to about 1500 V, in some embodiments from about 20 V to about 1000 V, and in some embodiments from about 30 V to about 750 V, in some embodiments from about 40 V to about 500 V, in some embodiments from about 50 V to about 350 V. The applied bias field may likewise range from about 0.2 V/μm to about 50 V/μm, in some embodiments from about 0.5 V/μm to about 40 V/μm, in some embodiments, from about 0.5 V/μm to about 25 V/μm, and in some embodiments, from about 1 V/μm to about 7 V/μm.

The capacitance value may also be controlled within a wider range of values than conventionally thought possible. For example, capacitors may be constructed with tuning capability having initial capacitance values ranging from 0.5 to 50,000,000 picoFarads ("pF"), as discussed below. Thus, the capacitor can be used in applications where a high capacitance is required, such as at values of 100 μF or more, in some embodiments about 10,000 μF or more, in some embodiments from about 100,000 to about 10,000,000 μF, in some embodiments from about 200,000 to 5,000,000 μF, and in some embodiments from about 400,000 to about 3,500,000 μF. Likewise, in other embodiments, the capacitor can be used in applications where a low capacitance is required, such as at values of less than 100 μF, in some embodiments about 50 μF or more, in some embodiments from about 0.5 to about 30 μF, and in some embodiments from about 1 to about 10 μF. The degree to which the capacitance can be tuned may vary as desired. For example, the capacitance may be adjusted by a value of from about 10% to about 100%, in some embodiments from about 20% to about 95%, and in some embodiments, from about 30% to about 80% of its initial value. Capacitance may be determined using an Agilent 4294A impedance analyzer at a frequency of 1 kHz or 1 MHz, temperature of about 25° C., and at a fixed oscillation of 500 mV.

In some embodiments, the dielectric layers may have thicknesses ranging from about 5 micrometer (μm) to about 150 μm, in some embodiments from about 15 μm to about 100 μm, and in some embodiments from about 30 μm to about 70 μm, e.g., about 50 μm. The electrode layers may have thicknesses ranging from about 0.5 μm to about 3.0 μm, in some embodiments from about 1 μm to about 2.5 μm, and in some embodiments from about 1 μm to about 2 μm, e.g., about 1.5 μm.

The total number of active and bias electrode layers may vary. For example, in some embodiments, the total number of active electrode layers may range from 2 to about 10,000, in some embodiments, from 2 to about 1,000, in some embodiments from about 10 to about 500, and in some embodiments from about 30 to about 120, e.g., about 50. For example, in some embodiments, the total number of bias electrodes may range from 2 to about 10,000, in some embodiments, from 2 to about 1,000, in some embodiments from about 10 to about 500, and in some embodiments from about 30 to about 120, e.g., about 50. It should be understood that the numbers of electrode and bias layers depicted in the Figures and described herein are illustrative only.

The length of the capacitor may, for instance, range from about 1 millimeter (mm) to about 50 mm, in some embodiments from about 2 mm to about 35 mm, in some embodiments from about 5 mm to about 15 mm, in some embodiments from about 7 mm to about 14 mm. The width of the capacitor may, for instance, range from about 1 mm to about 50 mm, in some embodiments from about 2 mm to about 35 mm, in some embodiments from about 5 mm to about 15 mm, in some embodiments from about 7 mm to about 14 mm.

The height of the capacitor may, for instance, range from about 0.5 mm to about 14 mm, in some embodiments from about 0.75 mm to about 7 mm, in some embodiments from about 1 mm to about 5 mm, in some embodiments from about 2 mm to about 5 mm, e.g., about 3 mm. The ratio of the length of the capacitor to the height of the capacitor may, for instance, range from about 1 to about 15, in some embodiments from about 2 to about 7, in some embodiments from about 3 to about 5, e.g., about 4. The ratio of the width of the capacitor to the height of the capacitor may, for instance, range from about 1 to about 15, in some embodiments from about 2 to about 7, in some embodiments from about 3 to about 5, e.g., about 4.

FIG. 1 illustrates in graphic form the change in capacitance that can be achieved over a range of normalized biasing voltage changes. Specifically, the horizontal axis graphs a normalized biased voltage as a percentage of the rated voltage of a device, such as from 0% to 150%. As shown, a corresponding change in device effective capacitance is graphed on the vertical axis, as a percentage of change from the capacitance value without any bias. As shown by the graph of such FIG. 1, an increase of 150% in the normalized bias voltage amount approaches towards an 80% decrease in the no-bias capacitance value, along a relatively straight-line curve, as illustrated. In such way, a voltage tunable capacitor device in accordance with the presently disclosed subject matter helps to maximize efficiency over a range of use conditions.

Referring now to FIGS. 2A-2D, one particular embodiment of a capacitor 10 that can be formed in accordance with the present invention will now be described in further detail. As shown, the capacitor 10 contains a plurality of dielectric layers 12 that are stacked alternately relative to two separate sets of active electrodes 14 and 20 and two separate sets of bias electrodes 22 and 26. The capacitor may be a six-sided body, such as a rectangular-shaped body. In the illustrated embodiment, a first active termination 16 is electrically connected to the first active electrodes 14 and a second active termination 18 is electrically connected to the second active electrodes 20. The first bias electrodes 22 are electrically connected with a first DC bias (+) termination 30 via extending members 24 (e.g., tabs) that extend to the side of the capacitor 10. Similarly, the second bias electrodes 26 are electrically connected with a second DC bias (−) termination 32 via extending members 28. Accordingly, the resulting capacitor 10 contains four (4) separate terminations. In some embodiments, the active terminations 16, 18 may wrap around the respective ends of the capacitor 10 to provide larger terminations 16, 18 for electrically connecting the capacitor 10 in a circuit. The DC bias terminations 30, 32 may be configured as strips that do not extend the entire sides of the capacitor 10. In other embodiments, however, the DC bias terminations 30, 32 may instead wrap around the sides of the capacitor 10, and the active terminations 16, 18 may be configured as strips that do not extend the along the entire ends of the capacitor.

Figure 2A:
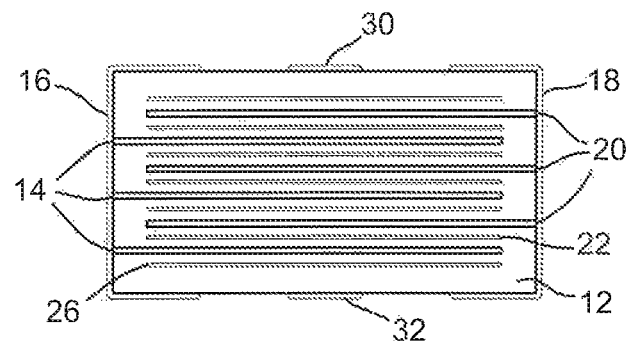
FIGS. 2A, 2B, and 2C illustrate, respectively, a sectional view, an exploded plan view, and an exploded perspective view, of an exemplary embodiment of a four-termination biased multilayer capacitor in accordance with presently disclosed subject matter.
Figure 2B:
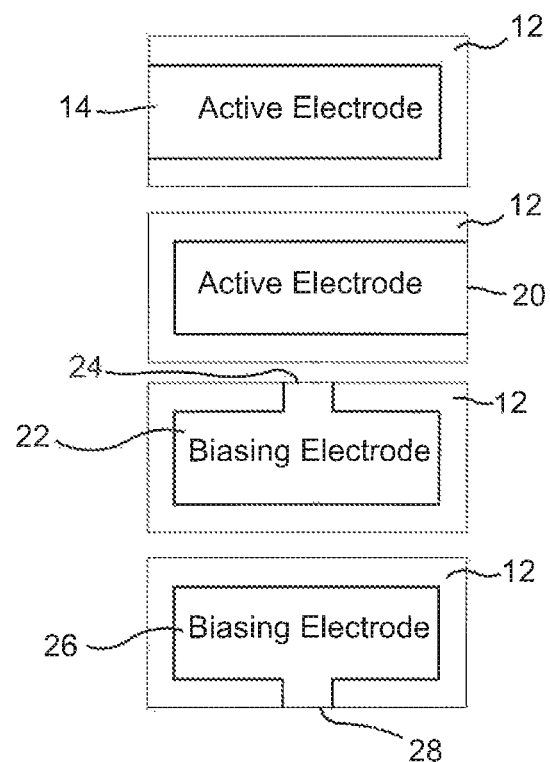
Figure 2C:
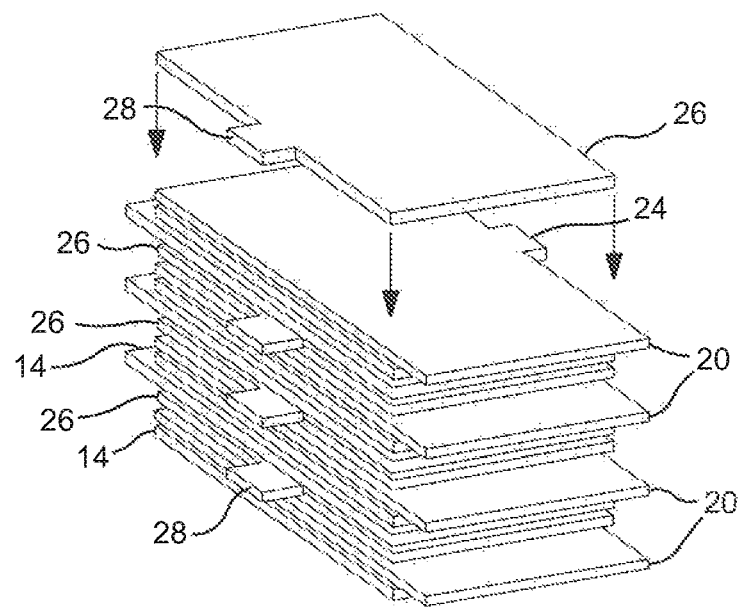
Figure 2D:
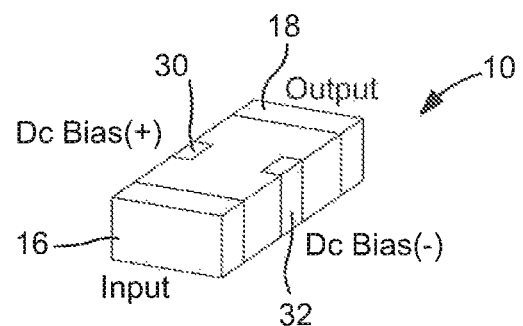
FIG. 2D illustrates a perspective view of an assembled device in accordance with the exemplary embodiment of present FIGS. 2A through 2C.
Figure 2E:
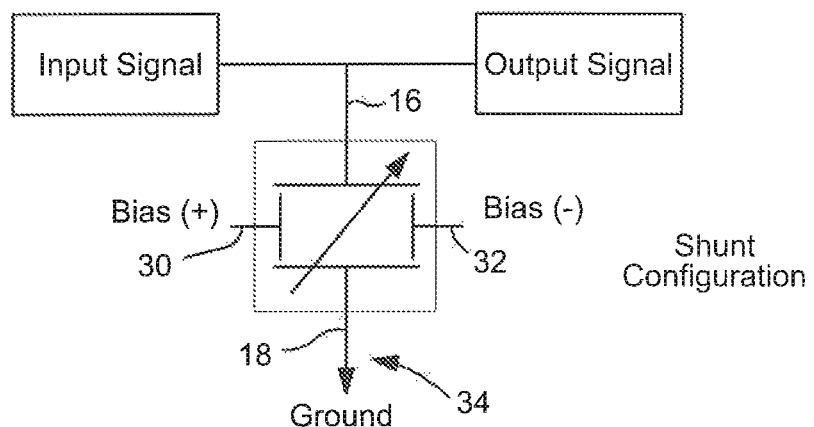
FIGS. 2E and 2F illustrate, respectively, shunt configuration and series configuration representative diagrams of circuits including the device of FIGS. 2A through 2D.
Figure 2F:
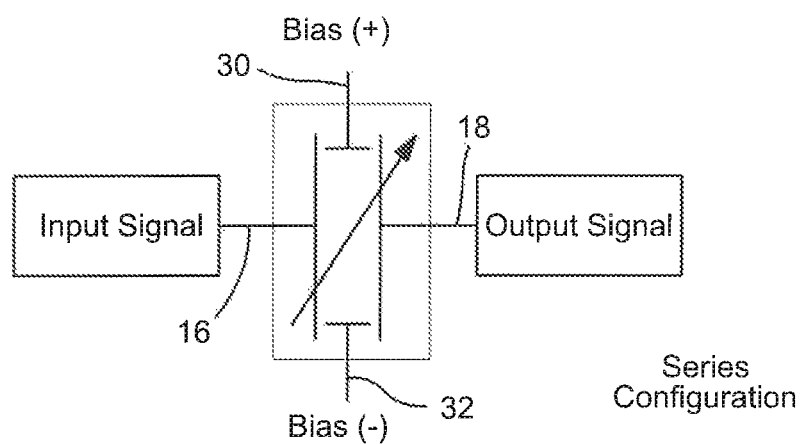

FIGS. 2E and 2F illustrate, respectively, shunt configuration and series configuration representative diagrams of the exemplary embodiment of present FIGS. 2A through 2D. As shown, a ground 34 is also provided relative to the biasing inputs is shown for the shunt configuration.

Figure 3A:
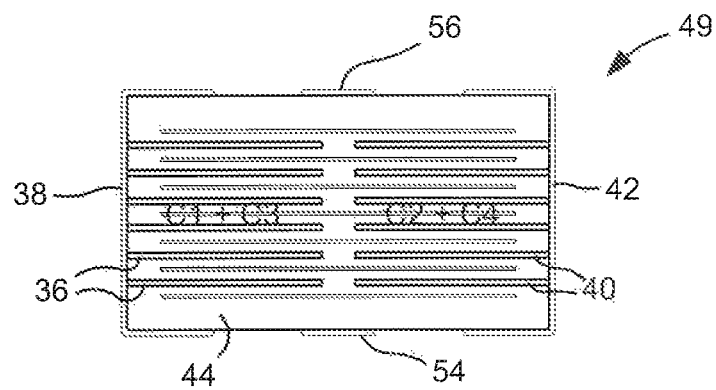
FIGS. 3A, 3B, and 3C illustrate, respectively, a sectional view, an exploded plan view, and an exploded perspective view, of an exemplary embodiment of a four-termination tunable cascade configuration multilayer capacitor in accordance with presently disclosed subject matter.
Figure 3B:
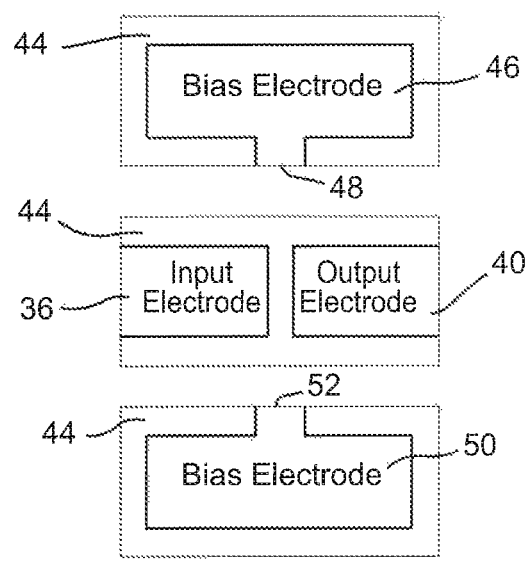
Figure 3C:
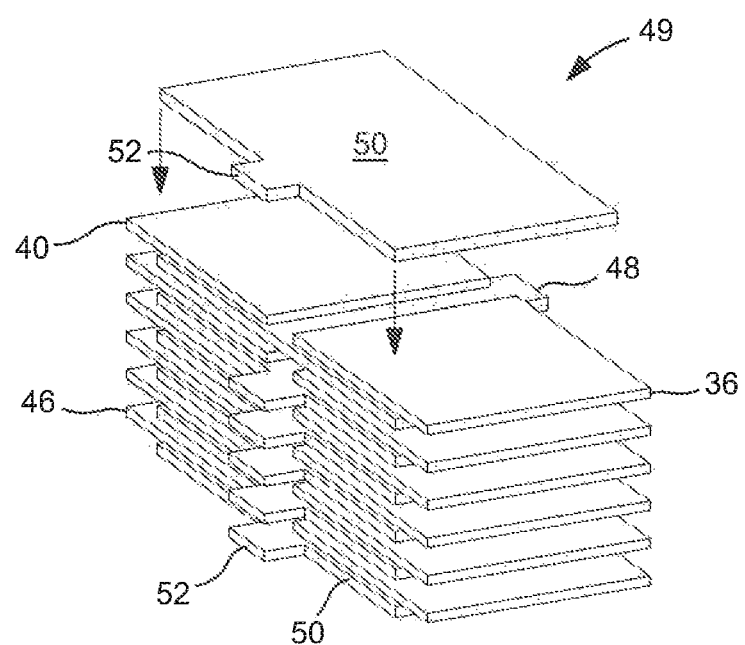
Figure 3D:
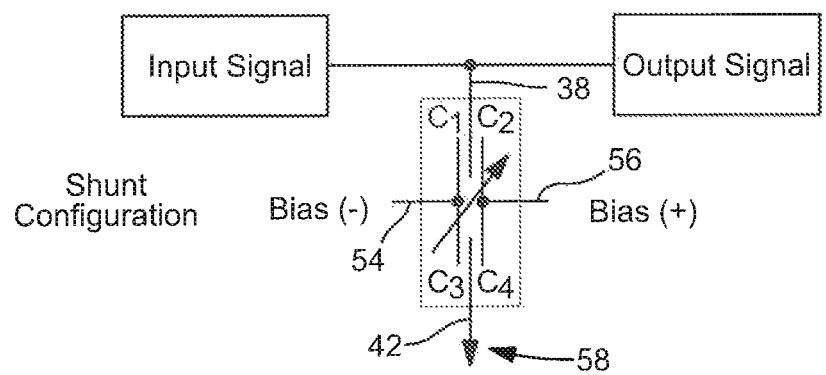
FIGS. 3D and 3E illustrate, respectively, shunt configuration and series configuration representative diagrams of circuits including the device of FIGS. 3A through 3C.
Figure 3E:
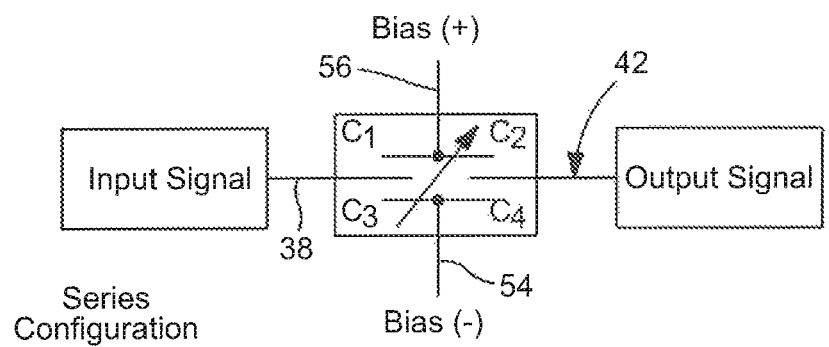

In the embodiment discussed above, the active electrodes are stacked so that each alternate electrode connects to opposite terminations. In certain embodiments, the alternating layers may be connected to the same terminations through the use of a "cascade" configuration in which each set of active electrodes is spaced apart laterally rather than in a stacked manner. One embodiment of such a cascaded capacitor 49 is shown in FIGS. 3A-3C. As depicted, the capacitor 49 contains a plurality of dielectric layers 44 that are arranged relative to two separate sets of active electrodes 36 and 40 and two separate sets of bias electrodes 46 and 50. In the illustrated embodiment, this instance, a first active termination 38 is electrically connected with the first active electrodes 36 and a second active termination 42 is electrically connected to the second active electrodes 40. The first bias electrodes 46 are electrically connected with a first DC bias (−) termination 54 via extending members 48 that extend to the side of the capacitor 49. Similarly, the second bias electrodes 50 are electrically connected with a second DC bias (+) termination 56 via extending members 52. FIGS. 3D and 3E illustrate, respectively, shunt configuration and series configuration representative diagrams of the exemplary embodiment of present FIGS. 3A through 3C. As shown, a ground 58 is also provided relative to the biasing inputs is shown for the shunt configuration.

Figure 4A:
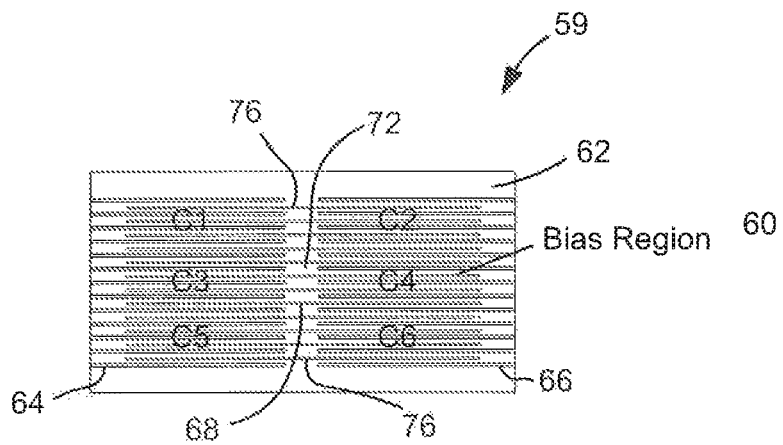
FIGS. 4A and 4B illustrate, respectively, a sectional view and an exploded plan view of an exemplary embodiment of a four-termination tunable partially biased configuration multilayer capacitor in accordance with presently disclosed subject matter.
Figure 4B:
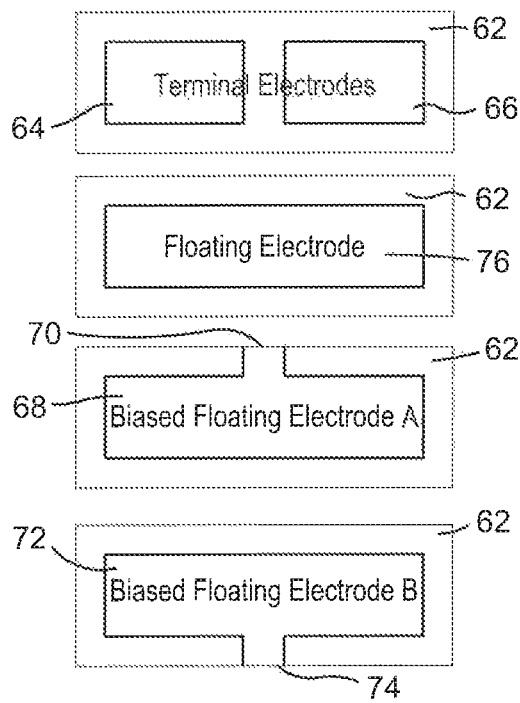
Figure 4C:
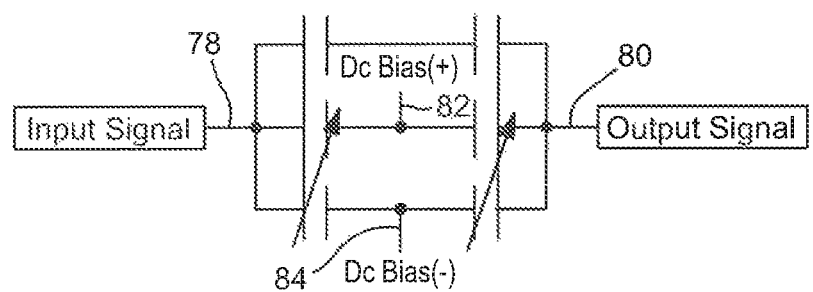
FIG. 4C illustrates a representative diagram of a circuit including the device FIGS. 4A and 4B.

FIGS. 4A-4C illustrate another embodiment of a capacitor 59 that may be formed in a partially cascaded configuration in accordance with the present invention. The capacitor 59 is considered "partially cascaded" because only a partial region 60 of the total active capacitance region is biased (see FIG. 4A). The addition of biased floating electrodes as illustrated allows application of external voltage to change the dielectric properties of a total capacitance to be determined by other factors and features. As shown by such FIGS., dielectric layers 62 may be stacked alternately relative to first and second sets of active electrodes 64 and 66, first and second sets of bias electrodes 68 and 72, and a plurality of floating electrodes 76. The first active electrodes 64 are electrically connected with a first active termination 78 while the second active electrodes 66 are electrically connected with a second active termination 80. The first bias electrodes 68 are electrically connected with a first DC bias (+) termination 82 via extending members 70 that extend to the side of the capacitor 59. Similarly, the second bias electrodes 72 are electrically connected with a second DC bias (−) termination 84 via extending members 74. It should be understood that the number of electrode layers illustrated in FIG. 4A is illustrative only. As discussed above, in some embodiments, the number of active electrodes may range from 2 to about 10,000. As discussed above, in some embodiments, the number of bias electrodes may range from 2 to about 10,000.

Figure 7B:
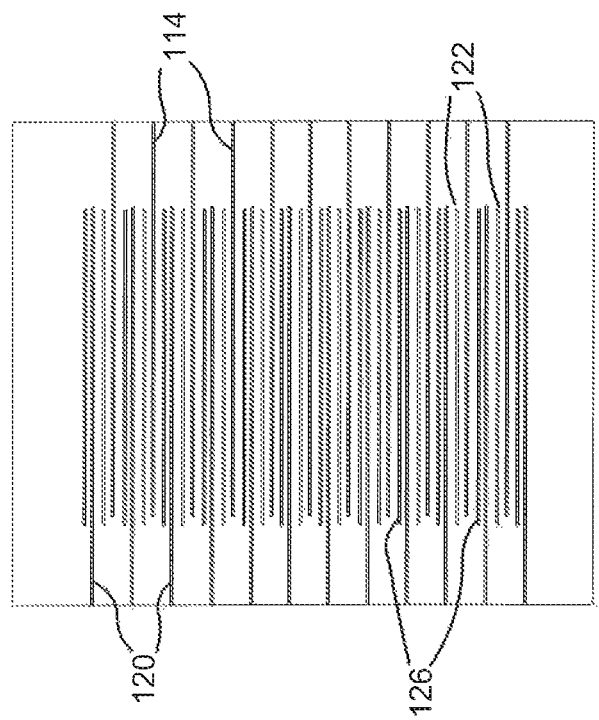
FIGS. 7A and 7B, illustrate, respectively, a sectional view and a partially expanded perspective view, of an exemplary embodiment of a 1:1 ratio overlapped symmetric design of a biased multilayer capacitor in accordance with presently disclosed subject matter.
Figure 7A:
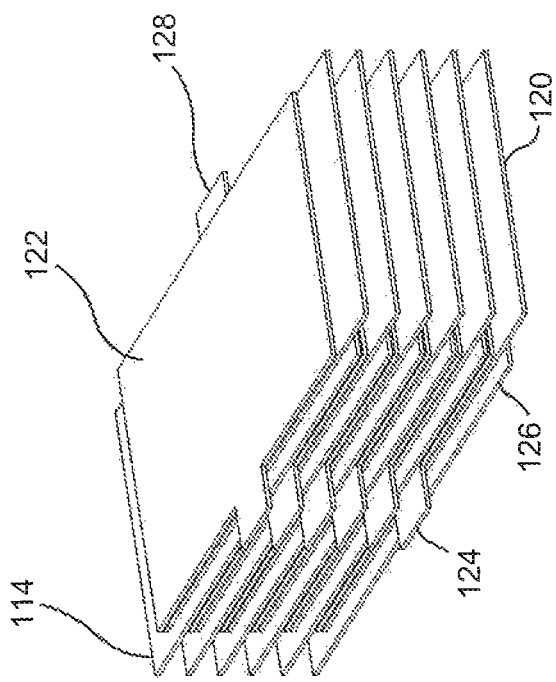

Yet another embodiment in accordance with aspects of the present disclosure is shown in FIGS. 7A and 7B. In this embodiment, first and second sets of active electrodes 114, 120, respectively, are stacked in an alternating 1:1 ratio pattern with first and second sets of bias electrodes 122, 126, respectively. Referring to FIG. 7B, in some embodiments, the leads 124, 128 of the bias electrodes 122, 126, may be configured as protruding tabs. The leads 124, 128 may contact the DC bias terminations 30, 32 in the finished form as illustrated in FIG. 2D. It should be understood that the number of electrode layers illustrated in FIGS. 7A and 7B are illustrative only.

Figure 7D:
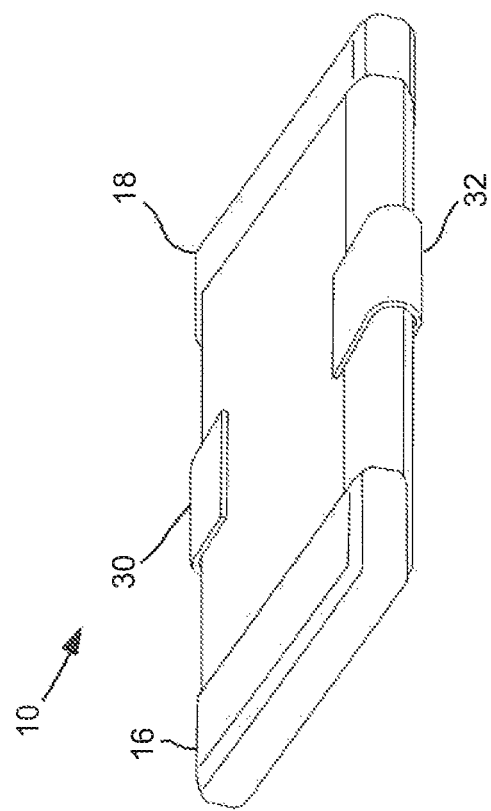
FIGS. 7C and 7D, illustrate, respectively, an exploded internal perspective view and a perspective view of another exemplary embodiment of a 1:1 ratio overlapped symmetric design of a biased multilayer capacitor in accordance with presently disclosed subject matter.
Figure 7C:
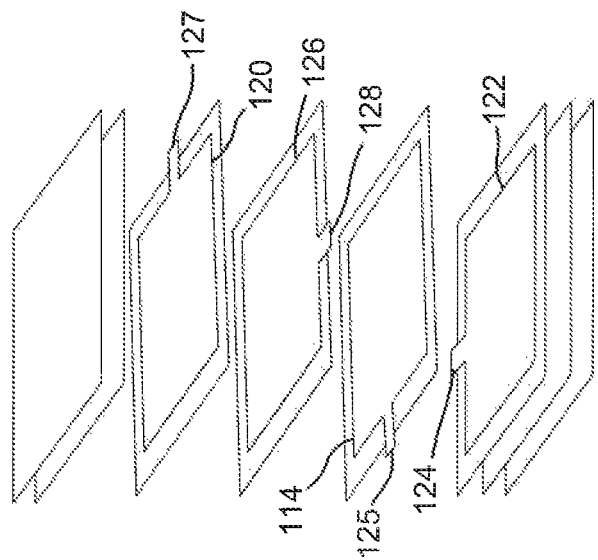

Another embodiment in accordance with aspects of the present disclosure is illustrated in FIGS. 7C and 7D. In this embodiment, the active electrodes 114, 120 may include respective leads 125 and 127 which may be configured as protruding tabs. The leads 125, 127 may be electrically connected with the respective active terminations 16, 18, which are illustrated in FIG. 7D. This may provide improved lamination between the edges of the layers of the capacitor, specifically at the corners of the layers, which may result in a more robust capacitor. Additionally, this configuration may reduce the occurrence of delamination issues during manufacturing.

Additionally, the respective widths of the tabs 124, 125, 126, 127 may be selected to advantageously provide greater electrical contact (e.g., having less resistance) to the respective electrodes 114, 120, 122, 126. Additionally, the widths of the tabs 124, 128 and widths of the terminations 30, 32 that are associated with the DC bias electrodes 122, 126 may be selected to avoid contact between the bias electrode terminations 30, 32 and the signal electrode terminations 16, 18. For example, in some embodiments, the tabs 124, 125, 126, 127 may extend along 10% or more of the edge of the capacitor, in some embodiments 30% or more, and in some embodiments 60% or more. It should be understood that the number of electrode layers illustrated in FIGS. 7A-7D is illustrative only. As discussed above, in some embodiments, the number of active electrodes may range from 2 to about 10,000. As discussed above, in some embodiments, the number of bias electrodes may range from 2 to about 10,000.

Figure 6:
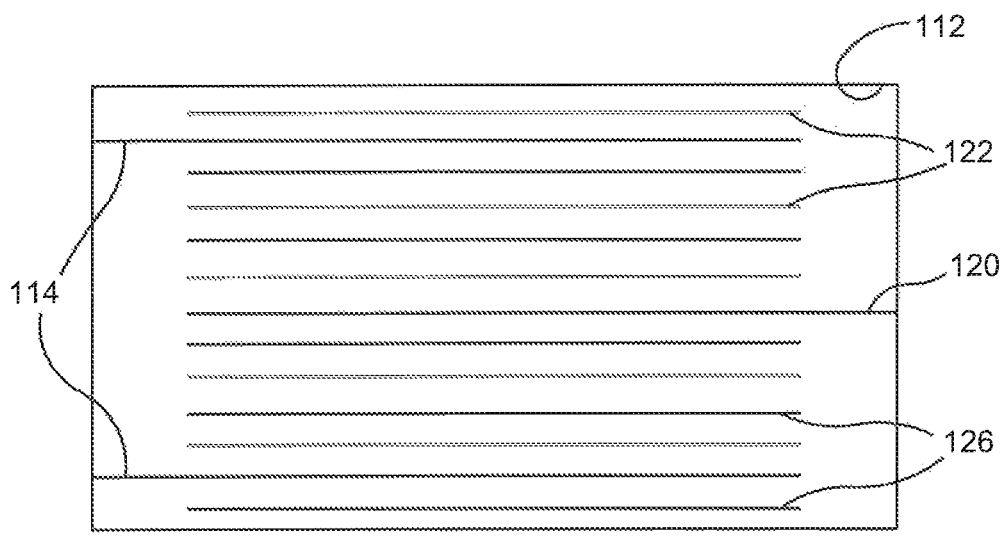
FIG. 6 illustrates a sectional view of an exemplary embodiment of a biased asymmetrical multilayer capacitor in accordance with presently disclosed subject matter.

In the embodiments discussed above, the electrodes are generally employed in a "symmetric" configuration in that the distance (or dielectric thickness) between the first active electrode and the second active electrode is generally the same as the distance between the first bias electrode and the second bias electrode. In certain embodiments, however, it may be desired to vary this thickness to achieve an "asymmetric" configuration. For example, the distance between the first and second active electrodes may be less than the distance between the first and second bias electrodes. In yet other embodiments, the distance between the first and second active electrodes may be greater than the distance between the first and second bias electrodes. Among other things, this may increase the DC field applied for a given level of applied DC bias, which will increase the level of tunability for a given DC bias voltage. Such an arrangement may also allow relatively larger tunability for relatively more modest DC voltages and the use of materials with modest tunability (with potentially lower losses and temperature/frequency variability). While such an asymmetric configuration can be accomplished in a variety of ways, it is typically desired to use additional "floating" bias electrodes between each pair of active electrodes. Referring to FIG. 6, for instance, one embodiment of such an asymmetric capacitor is shown that contains first and second active electrodes 114 and 120, respectively, in conjunction with first and second bias electrodes 122 and 126, respectively.

FIG. 8 illustrates another embodiment of an asymmetric capacitor in which every $11^{th}$ electrode is an active electrode instead of a bias electrode (11:1 ratio design.) In this case, each such respective active electrode (e.g., AC electrode) may be bounded by a pair of DC bias electrode having opposing polarities. Thus, a biasing field may be generated across each AC electrode. Such a configuration may provide capacitive coupling between the AC signal and both polarities of DC bias voltage, and vice versa. Each AC electrode 214, 220 may be disposed between a pair of bias electrodes having opposing polarities 222, 226. A first set of bias electrodes 222 may all have the same polarity, and a second set of bias electrodes 226 (illustrated with dashed lines) may all have opposite respective polarities to the first set of bias electrodes 222. This configuration may provide capacitive coupling between each AC electrode 214, 220 and both DC bias polarities.

FIG. 9 illustrates a sectional view of an exemplary embodiment of an 11:1 ratio "shielded" asymmetric design of a biased multilayer capacitor in accordance with presently disclosed subject matter. This is similar to the example shown in FIG. 8 except that each AC electrode 314, 320 is bounded by a pair of DC electrodes (322 or 326) having the same polarity. One set of bias electrodes 322 may all have the same polarity, and the other set of bias electrodes 326 (illustrated with dashed lines) may all have the opposite polarity. While the material between the two DC electrodes (322 or 326) having the same polarity may not provide tuning, the material may potentially provide shielding to the AC signal, reducing associated noise. Such a configuration may also provide coupling between each of the first set of AC electrodes 314 with a single DC bias polarity only. Similarly such a configuration may provide capacitive coupling between the second set of AC electrodes 320 and the opposite DC bias polarity only.

It should be understood that the numbers of electrode layers illustrated in FIGS. 8 and 9 are illustrative only. As indicated above, in some embodiments, the number of active electrodes may range from 2 to about 10,000. As discussed above, in some embodiments, the number of bias electrodes may range from 2 to about 10,000.

Figure 11:
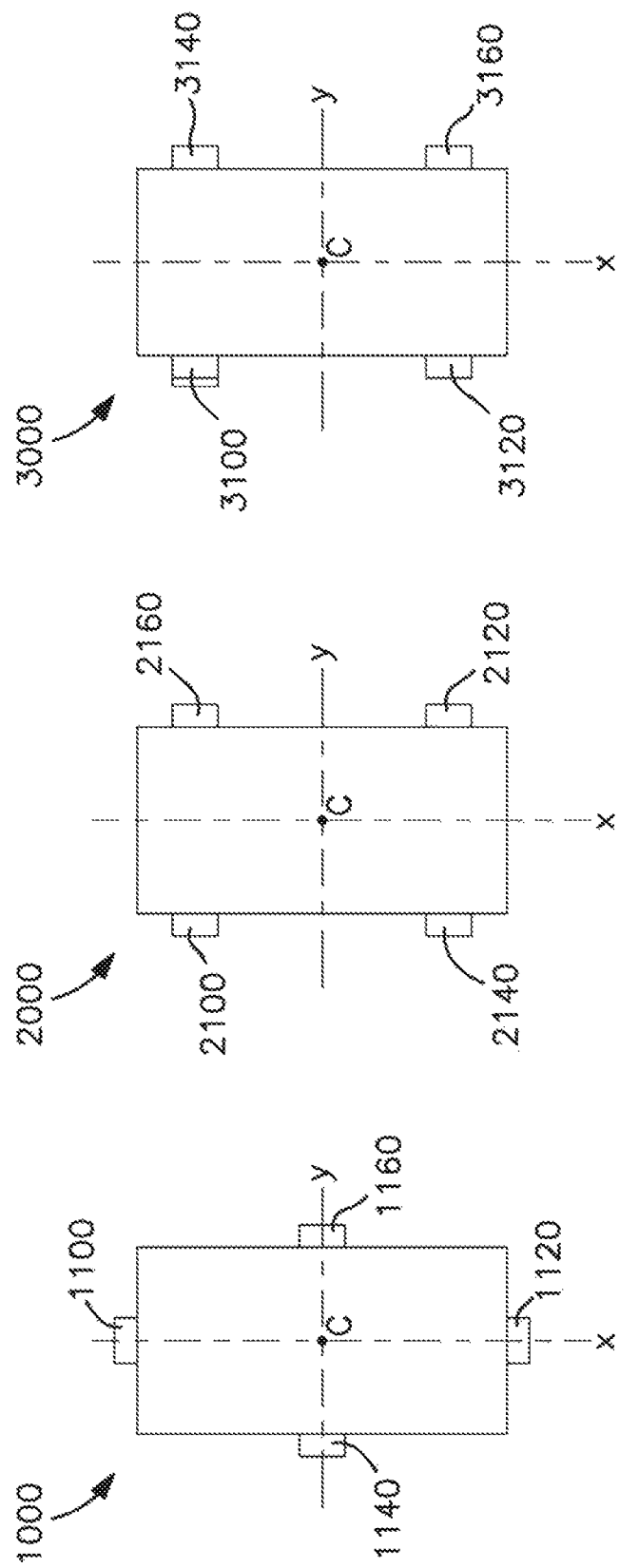
FIGS. 11A, 11B, and 11C illustrate, respectively, various symmetric orientations that may be employed for the active and bias terminations in certain embodiments of the present invention.

Although not necessarily required, it is typically desired that the active and DC bias terminations are disposed symmetrically about an axis of the capacitor. For example, in one embodiment, the capacitor may contain opposing first and second end regions that are spaced apart in a longitudinal direction and opposing first and side regions that are spaced apart in a lateral direction. In certain embodiments, the active terminations may be located at respective end regions of the capacitor while the DC bias terminations may be located at respective side regions of the capacitor. When symmetrically arranged, the active terminations and/or DC bias terminations may be spaced equidistant from a longitudinal and/or lateral axis extending through the geometric center of the capacitor. Referring to FIG. 11(*a*), for example, one embodiment of a capacitor 1000 is shown that contains a longitudinal axis "x" and a lateral axis "y" that are perpendicular to each other and extend through a geometrical center "C." In this particular embodiment, the capacitor 1000 contains first and second active terminations 1100 and 1120, respectively, which are located at end regions of the capacitor 1000 and centered about both the axes "x" and "y." Similarly, the capacitor 1000 contains first and second bias terminations 1140 and 1160 that are located at side regions of the capacitor 1000 and also centered about both the axes "x" and "y."

In certain embodiments, it may also be desired to locate two or more terminations on the same side of the capacitor. In FIG. 11(*b*), for instance, one embodiment of a capacitor 2000 is shown that contains a first active termination 2100 and second active termination 2140 that are located on the same side region. The capacitor 2000 also contains a first bias termination 2160 and a second bias termination 2120 that are both located on another side region opposite to that of the active terminations. Despite being located only on the side regions, the active terminations 2100 and 2140 are still symmetrically arranged in that they are both positioned equidistant from the axes "x" and "y." Similarly, the bias terminations 2160 and 2120 that are also located equidistant from the axes "x" and "y." In the above-referenced embodiments, the first active termination and first bias termination are positioned opposite to the respective second active termination and second bias termination. Of course, this is by no means required. In FIG. 11(*c*), for instance, a capacitor 3000 is shown that contains first and second active electrode terminations 3100 and 3160, respectively, which are located at opposite side regions in an offset configuration. Nevertheless, the first active termination 3100 and second active termination 3160 are still symmetrically arranged in that they are both positioned equidistant from the axes "x" and "y." Similarly, the capacitor 3000 also contains first and second bias terminations 3120 and 3140 that are located at opposite side regions in an offset configuration yet equidistant from the axes "x" and "y."

Figure 5:
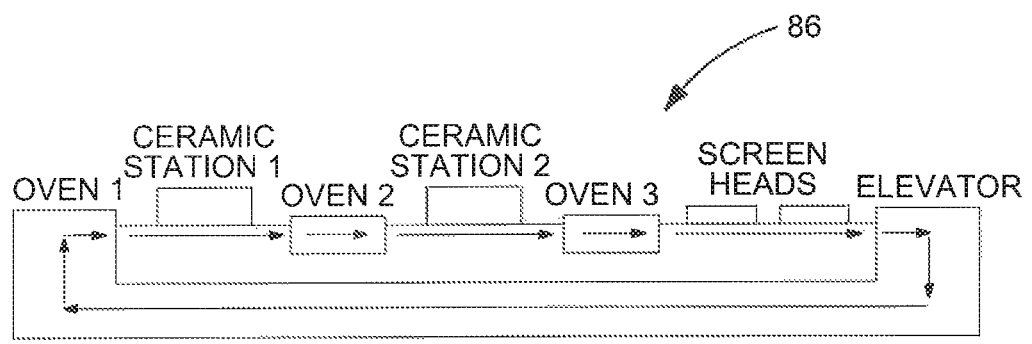
FIG. 5 represents a chip manufacturing automated process (CMAP) exemplary embodiment in accordance with presently disclosed subject matter, usable in manufacturing device exemplary embodiments as disclosed herewith.

The presently disclosed subject matter equally encompasses associated and/or corresponding methodologies for improved voltage tunable devices, including for example, production of such devices, as well as their use in combination with associated circuitry. As further example, FIG. 5 represents a chip manufacturing automated process (CMAP) 86, which is usable in conjunction with manufacturing device exemplary embodiments as disclosed herewith. As shown, the process 86 may include a number of successive stages, involving in some instances three ovens with interceding ceramic stations or other steps/facets such as the use of screen heads or elevator and conveyor features, as representatively shown. Those of ordinary skill in the art will understand that the exact provision of successive steps will depend on which of the exemplary device embodiments disclosed herewith (or modifications thereof) are being produced. Also, the individual steps indicated are only intended as representative of the indicated type of step, and do not denote required use of other aspects beyond the general nature of the steps indicated. For example, the screen head step may involve the use of a stainless steel screen together with an electrode paste for screen pasting of electrode layers, or other technologies for such step may be practiced. For example, more conventional steps of alternate stacking and laminating (with tapes) may be practiced. In either process (or others), those of ordinary skill in the art will recognize that selected steps may be practiced to produce a particular design selected for a given application of the presently disclosed subject matter.

Figure 12:
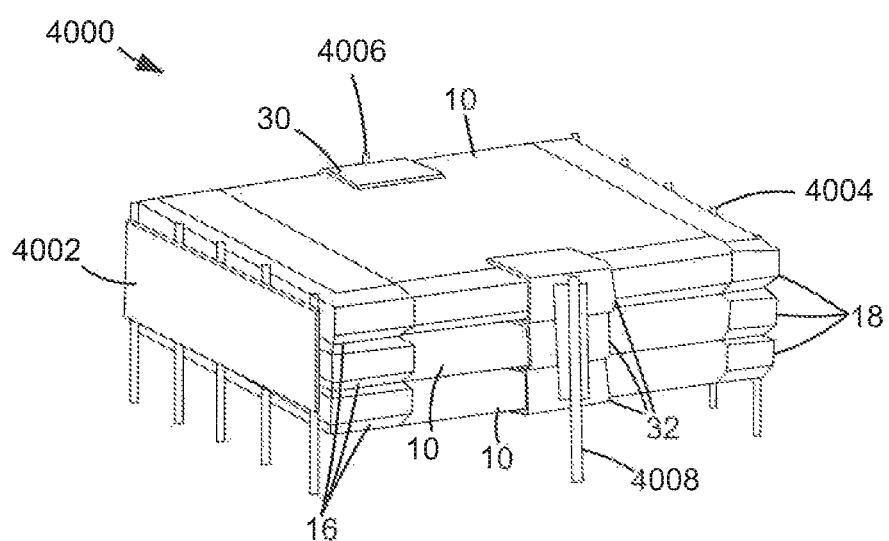
FIG. 12 illustrates an embodiment of a stacked capacitor array having single lead and lead frame attachments in accordance with aspects of the presently disclosed subject matter.

Referring to FIG. 12, a stacked capacitor array 4000 may be formed by stacking individual capacitors 10, for example as shown in FIGS. 2A-2D. The stacked capacitor array 4000 may provide increased capacitance compared to a single capacitor 10 and may allow for easier manufacturing and assembly. The capacitors 10 may be connected in parallel. For example, a first lead frame 4002 may connect each first active termination 16, and a second lead frame 4004 may connect each second active termination 19. A first single lead 4006 may connect each first DC bias termination 30, and a second single lead 4008 may connect each second DC bias termination 32. As indicated above with regard to FIGS. 2A-2D, in some embodiments, the configurations of the active terminations 16, 18 and DC bias terminations 30, 32 may be reversed. For example, the DC bias terminations 30, 32 may wrap around the capacitor 10 instead of the active terminations 16, 18 wrapping around the capacitor 10 as illustrated in FIG. 12. In some embodiments, the stacked capacitor array 4000 may include 2 to 24 capacitors, in some embodiments 3 to 12 capacitors, and in some embodiments 4 to 6 capacitors. In other embodiments, the stacked capacitor array 4000 may include greater than 24 capacitors.

The capacitor of the present invention may be employed in a wide variety of applications, including, for example, circuits used in aircraft. For example, one application may include an alternating circuit operating in a frequency range from about 200 Hz to about 1200 Hz, in some embodiments from about 300 Hz to about 1100 Hz, and in some embodiments from about 400 Hz to about 1000 Hz. In such an application, the capacitor may have a capacitance ranging from about 5 microFarads (pF) to about to about 15 μF, and in some embodiments from about 8 μF to about 12 μF, e.g., about 10 μF. The applied bias voltage may range from about 100 V to about 300 V, in some embodiments from about 150 V to about 250 V, e.g., about 200 V.

Additional applications may include circuitry enabled for tuning the oscillation frequency of a switch mode power supply. Through the use of the capacitor of the present invention, better tunability can be selectively obtained at high DC voltages (i.e., biasing voltages), while allowing the use of materials with relatively modest tunability but with potentially lower losses and lower temperature/frequency variability. Other suitable applications may include, for instance, waveguides, RF applications (e.g., delay lines), antenna structures, filters (e.g., point-of-load filters and circuits), matching networks, resonant circuits, smoothing capacitors in variable load circuits, and other applications.

Example

A stacked capacitor array including multiple tunable multilayer capacitors according to aspects of the present disclosure was demonstrated. The stacked capacitor array was assembled as illustrated in FIG. 12 and included three tunable multilayer capacitors. The capacitor array had an overall length of about 12.7 mm (0.5 in), an overall width of about 12.7 mm (0.5 in), and an overall height of about 3.1 mm (0.12 in).

Each of the three capacitors of the array included a dielectric material that included barium titanate. Each dielectric layer had a thickness of about 50 μm. There were 54 active electrodes and 55 bias electrodes in alternation. Each individual capacitor had a capacitance of about 1.8 μF.

An alternating current sinusoidal signal having an amplitude of 1 V and a frequency of 1 KHz was applied across the active terminations 16, 19 (via the first and second lead frames 4002, 4004). A variety of DC bias voltage levels were applied across the DC bias terminations 30, 32 (via the first and second single leads 4006, 4008).

Figure 13:
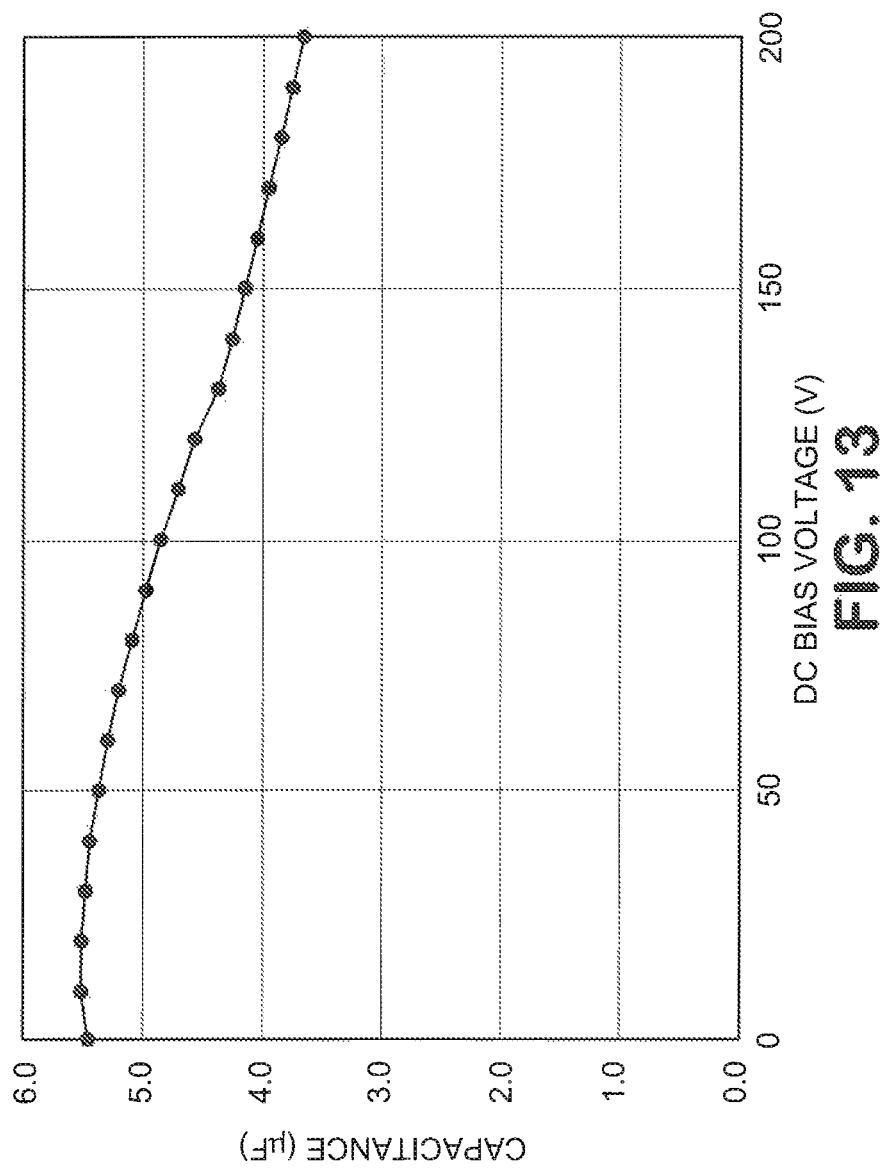
FIG. 13 shows measured capacitance of an example stacked capacitor array according to aspects of the present disclosure with applied DC bias voltage levels ranging from 0 V to 200 V.

FIG. 13 shows the measured capacitance of the stacked capacitor array across the first and second lead frames 4002, 4004 at DC bias voltage levels ranging from 0 V to 200 V. As shown in FIG. 13, the measured capacitance between the active terminations 16, 19 decreased from 5.47 μF at a DC bias voltage of 0 V to about 3.66 μF at a DC bias voltage of 200 V. The measured capacitance values and applied DC bias voltages plotted in FIG. 13 are presented in the table below, in addition to a "tunability" parameter. The "Tunability" parameter was calculated as the measured capacitance at each DC bias voltage level divided by the initial capacitance at a DC bias voltage of 0V (5.47 μF).

TABLE 1

Capacitance vs. DC Bias Voltage

| DC Bias Voltage (V) | Tunability (%) | Capacitance (μF) |
| --- | --- | --- |
| 0 | 100% | 5.47 |
| 10 | 100.9% | 5.52 |
| 20 | 100.9% | 5.52 |
| 30 | 100.4% | 5.49 |
| 40 | 99.6% | 5.45 |
| 50 | 98.4% | 5.38 |
| 60 | 96.9% | 5.30 |
| 70 | 95.2% | 5.21 |
| 80 | 93.2% | 5.10 |
| 90 | 91.0% | 4.98 |
| 100 | 88.7% | 4.85 |
| 110 | 85.9% | 4.70 |
| 120 | 83.5% | 4.57 |
| 130 | 79.9% | 4.37 |
| 140 | 77.7% | 4.25 |
| 150 | 75.7% | 4.14 |
| 160 | 73.9% | 4.04 |
| 170 | 72.2% | 3.95 |
| 180 | 70.4% | 3.85 |
| 190 | 68.6% | 3.75 |
| 200 | 66.9% | 3.66 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims

What is claimed is:

1. A tunable multilayer capacitor comprising:
 a first active electrode in electrical contact with a first active termination;
 a second active electrode in electrical contact with a second active termination;
 a first DC bias electrode in electrical contact with a first DC bias termination;
 a second DC bias electrode in electrical contact with a second DC bias termination; and
 a plurality of dielectric layers disposed between the first and second active electrodes and between the first and second bias electrodes, wherein at least a portion of the dielectric layers contain a tunable dielectric material that exhibits a variable dielectric constant upon the application of an applied DC voltage across the first and second DC bias electrodes, and wherein a thickness of at least one of the plurality of dielectric layers is greater than about 15 micrometers, or;

wherein the tunable dielectric material has a voltage tunability coefficient of from about 10% to about 95%, wherein the voltage tunability coefficient is determined according to the following general equation:

$$T=100\times(\varepsilon_0-\varepsilon_V)/\varepsilon_0$$

wherein,

T is the voltage tunability coefficient;

$\varepsilon_0$ is the static dielectric constant of the material without an applied voltage; and $\varepsilon_V$ is the variable dielectric constant of the material after application of an applied voltage (DC).

2. The capacitor of claim 1, wherein thicknesses of the plurality of dielectric layers range from about 15 micrometers to about 150 micrometers.

3. The capacitor of claim 1, wherein the applied DC bias voltage is from about 100 V to about 1000 V.

4. The capacitor of claim 1, wherein the capacitor has a length from about 7 mm to about 14 mm.

5. The capacitor of claim 1, wherein the capacitor has a width from about 7 mm to about 14 mm.

6. The capacitor of claim 1, wherein the capacitor has a height from about 2 mm to about 5 mm.

7. The capacitor of claim 1, wherein a ratio of a length of the capacitor divided by a height of the capacitor ranges from about 3 to about 5.

8. The capacitor of claim 1, wherein a total number of first and second active electrodes ranges from about 10 to about 100.

9. The capacitor of claim 1, wherein the static dielectric constant of the dielectric material is from about 100 to about 10,000 as determined in accordance with ASTM 02149-13 at an operating temperature of 25° C. and frequency of 1 kHz.

10. The capacitor of claim 1, wherein the dielectric material includes one or more ferroelectric base phases.

11. The capacitor of claim 10, wherein the dielectric material is a perovskite, tungsten bronze material, layered structure material, or a combination thereof.

12. The capacitor of claim 1, wherein the first and second active terminations and the first and second bias terminations are disposed symmetrically about the capacitor.

13. The capacitor of claim 1, wherein the distance between the first active electrode and the second active electrode is approximately the same as the distance between the first bias electrode and the second bias electrode.

14. The capacitor of claim 1, wherein the distance between the first active electrode and the second active electrode is greater than the distance between the first bias electrode and the second bias electrode.

15. The capacitor of claim 1, wherein the capacitor is capable of being tuned to a capacitance value ranging from about 200,000 pF to about 5,000,000 pF.

16. The capacitor of claim 1, wherein the capacitor is capable of being tuned to a capacitance value of about 200,000 pF or less.

17. The capacitor of claim 1, wherein the first bias electrode includes a tab extending to the first DC bias termination, the second bias electrode includes a tab extending to the second DC bias termination, or a combination thereof.

18. The capacitor of claim 1, wherein the first active electrode includes a tab extending to the first active termination, the second active electrode includes a tab extending to the second active termination, or a combination thereof.

19. A circuit comprising the capacitor of claim 1 and a power source that supplies a DC bias voltage to the capacitor through the first and second DC bias terminations.

20. A stacked capacitor array comprising the capacitor of claim 1 and a first lead frame connected with each first active termination and a second lead frame connected with each second active termination.

21. The stacked capacitor array of claim 20, further comprising a first single lead connected with each first DC bias termination and a second single lead connected with second DC bias termination.

22. A tunable multilayer capacitor comprising:
a first active electrode in electrical contact with a first active termination;
a second active electrode in electrical contact with a second active termination;
a first DC bias electrode in electrical contact with a first DC bias termination;
a second DC bias electrode in electrical contact with a second DC bias termination; and
a plurality of dielectric layers disposed between the first and second active electrodes and between the first and second bias electrodes, wherein at least a portion of the dielectric layers contain a tunable dielectric material that exhibits a variable dielectric constant upon the application of an applied DC voltage across the first and second DC bias electrodes, and wherein the applied DC voltage is greater than about 100 V without exceeding about 50% of a breakdown voltage of the tunable dielectric material.

23. A tunable multilayer capacitor comprising:
a first active electrode in electrical contact with a first active termination;
a second active electrode in electrical contact with a second active termination;
a first DC bias electrode in electrical contact with a first DC bias termination;
a second DC bias electrode in electrical contact with a second DC bias termination; and
a plurality of dielectric layers disposed between the first and second active electrodes and between the first and second bias electrodes, wherein at least a portion of the dielectric layers contain a tunable dielectric material that exhibits a variable dielectric constant upon the application of an applied DC voltage across the first and second DC bias electrodes, and wherein a thickness of at least one of the plurality of dielectric layers is greater than about 15 micrometers;
wherein the distance between the first active electrode and the second active electrode is greater than or approximately equal to the distance between the first bias electrode and the second bias electrode.

* * * * *